Patented Dec. 10, 1935

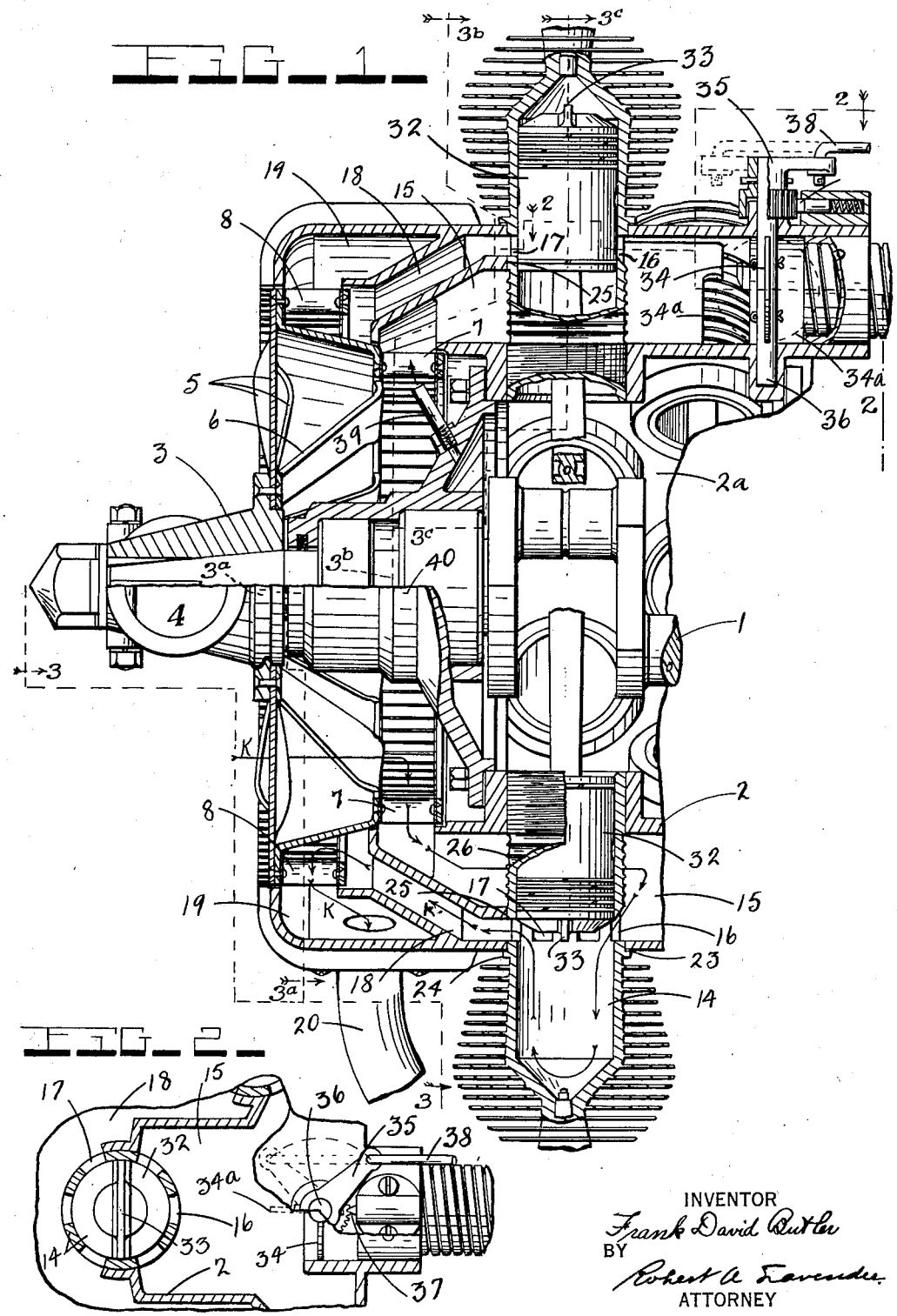

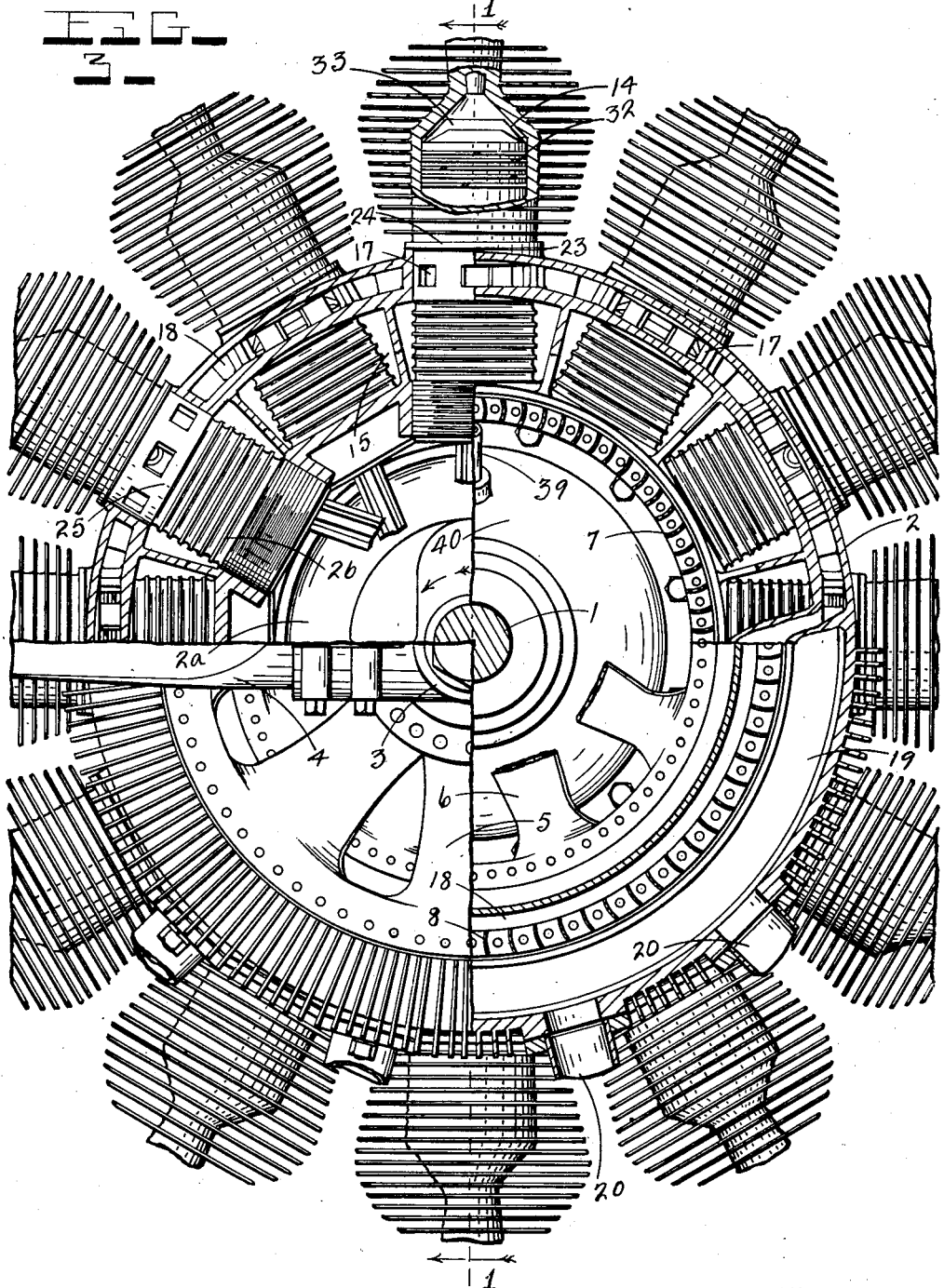

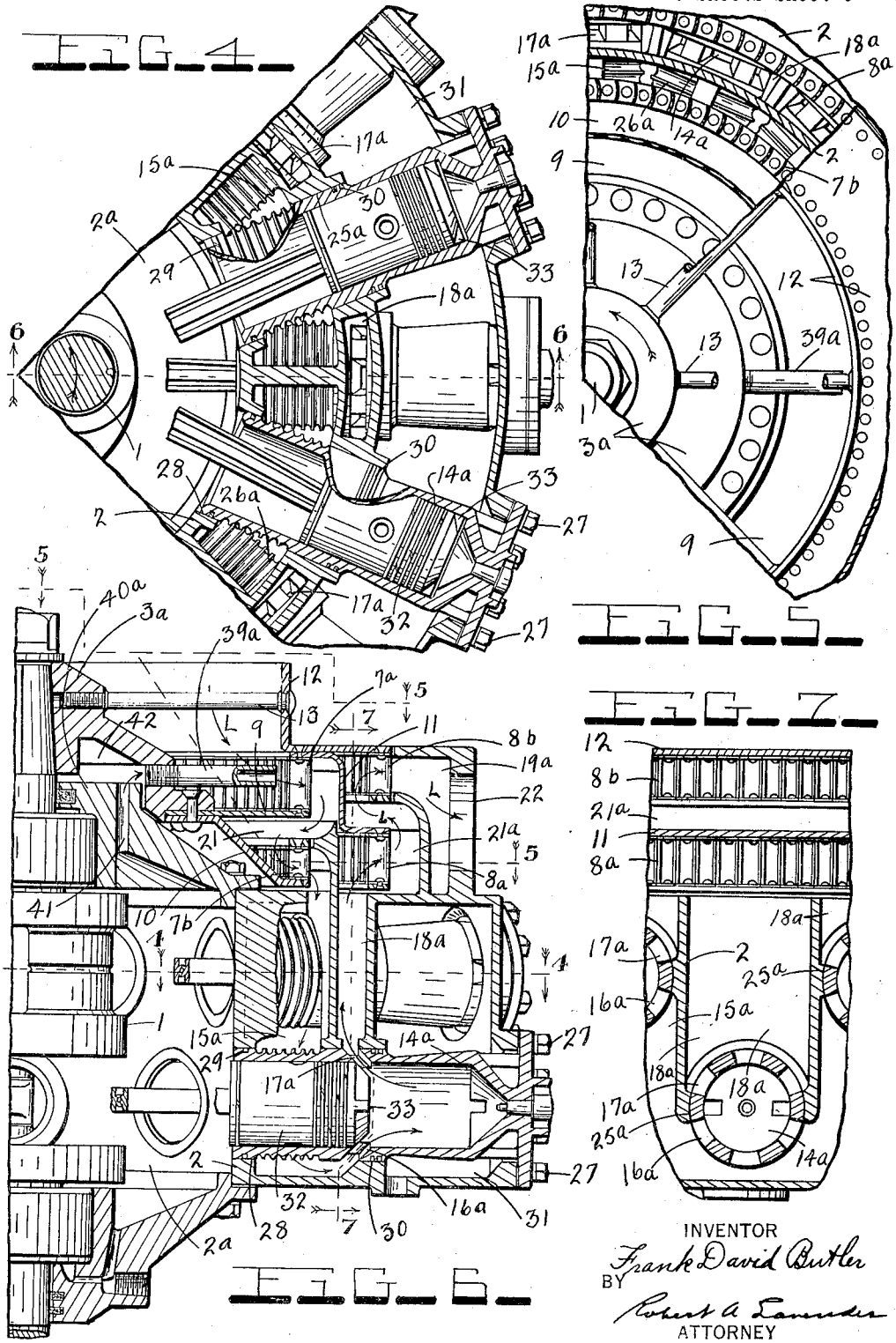

2,023,403

UNITED STATES PATENT OFFICE 2,023,403

COMBUSTION ENGINE

Frank David Butler, United States Navy,
Bremerton, Wash.

Application November 4, 1931, Serial No. 573,010

21 Claims. (Cl. 60—32)

(Granted under the act of March 3, 1883, as
amended April 30, 1928; 370 O. G. 757)

While my invention relates generally to combustion engines, it relates particularly to improvements in two stroke cycle engines of the type mentioned, and the objects of my improvements are; first, to provide means of supplying ingress air under a positive pressure to and simultaneously removing the residue gases under a negative pressure from each of the cylinder units of said engine by and through a rotary forced draft ingress blower and a rotary induced draft exhaust blower encased by the engine casing or a part thereof; second, to provide means of compounding the ingress blower mentioned and pressure staging the ingress air as it passes therethrough; third, to provide means of controlling the quantity of air that is supplied to the cylinder units by said ingress blower; fourth, to provide means in connection with said ingress blower for the purpose of ventilating and producing a slight vacuum on the crank case of said engine; fifth, to provide means of compounding the egress blower mentioned, for instance, by the formation of such blower into a plurality of units which successively act upon and accelerate the velocity of the exhaust or residue gases as they pass therethrough; and sixth, to produce an engine design of the type mentioned that is simple in construction, efficient in operation, durable in use, and that will generate the maximum quantity of horse power per pound of engine weight.

To the accomplishment of the foregoing and such other objects as may hereinafter appear, my invention consists in the construction, combination and arrangement of parts hereinafter described, illustrated in the accompanying drawings and defined in the annexed claims, it being understood that various changes may be made in practice, within the scope of the claims, without digressing from my inventive idea, or sacrificing any of the advantages hereinafter disclosed.

With reference to the drawings, two of the many possible embodiments of my invention are disclosed; Fig. 1 is a partly assembled longitudinal section through a radial, two stroke cycle, solid fuel injection, aviation engine designed and constructed as per my invention, and as would appear on the dotted and broken line 1—1 of Fig. 3; Fig. 2 is a combined plan and sectional view of the engine ingress air control means as it would appear substantially on the dotted and broken line 2—2 of Fig. 1; Fig. 3 is a combined front elevation and transverse section of Fig. 1, the lower left quarter of the former being as would appear on the dotted line 3—3 of the latter, the lower right quarter of the former being as would appear on the dotted line 3a—3a of the latter, the upper right quarter of the former being as would appear on the dotted line 3b—3b of the latter, and the upper left quarter of the former being as would appear on the dotted line 3c—3c of the latter; Fig. 4 is a partly assembled transverse section through a two stroke cycle, general service engine modified by water instead of air cooling and designed and constructed as per my invention and as would appear taken on the dotted line 4—4 of Fig. 6; Fig. 5 is a combined plan and transverse section of a portion of the engine construction illustrated in Fig. 6 and as would appear on the dotted and broken line 5—5—5 of the latter figure; Fig. 6 is a longitudinal section of the engine illustrated in Fig. 4 and as would appear on the dotted line 6—6 of the latter figure; and, Fig. 7 is a longitudinal section of the engine illustrated in Fig. 6 and as would appear on the dotted line 7—7 of the latter figure.

Bearing in mind the fact that Figs. 1 to 3 inclusive illustrate an aviation engine embodiment and Figs. 4 to 7 inclusive illustrate a general service engine embodiment and the fact that the condition of operation and general construction of these two types of engines are somewhat different, with reference to the symbols of the drawings, similar numerals and letters represent and indicate similar parts in the several views:—

The housing 2 in the instance shown comprises an annular ring at the center of which the crank shaft 1 is mounted in suitable bearings. At the front end of the crank shaft 1 the propeller 4 is mounted with its hub 3 rigidly attached to the crank shaft. Upon the rear portion of hub 3 is secured a circular disk of sheet metal having spokes 5, which are relatively wide and are angularly formed, to comprise fan blades 5. Upon the rear side of the blades and secured to hub 3 is a substantially W-shaped circular disk of sheet metal 6 whose portion adjacent hub 3 is provided with a plurality of segmental openings. The disks 5 and 6 are secured together at their peripheries and to the forward end of a plurality of fan blades 8 arranged in a row about the periphery of disks 5 and 6 and projected rearwardly therefrom. The rear ends of fan blades 8 are secured to a ring as shown in Fig. 1. To the rear side of disk 6, and spaced to the rear and of lesser diameter than the row of blades 8 is a row of fan blades 7 whose rear ends are secured to a ring as shown in Fig. 1. Upon the forward side of housing 2 is a projection provided with an annular exhaust manifold space 19 and an inner annular intake air manifold space 15. Said spaces 15 and 19 are separated by an intermediate annular exhaust passage space 18, Fig. 1. The annular row of fan blades 8 extends across the mouth of the exhaust space 19. The annular row of fan blades 7 extends across the mouth of intake space 15. The rows of blades 7 and 8 at opposite ends are juxtaposed to the annular edges of the mouths, respectively, of their spaces 15 and 19. The outlet mouth of the space 18 extends between the rows 7 and 8 of the fan blades and enters a space between the inner edge of the row of fan blades 8 and the angular periphery of disk 6. The exhaust manifold space 19 is provided with a suitable number of exhaust pipe outlets 20.

The cylinders 14 are preferably removably secured by being threaded or otherwise within the radial bores extending through the housing 2, each of said cylinders having intake ports 16 and exhaust ports 17 opening respectively into said manifold spaces 15 and 18, said ports 16 and 17 comprising openings extending through the cylinder wall and are opened and closed by the movement of the piston in each cylinder.

With reference to Figs. 1 to 3 inclusive, during the period the aviation engine is in operation, air under a positive pressure is supplied to the cylinders 14 from the atmosphere by means of and via the base portions of the propeller blades 4, the fan blades 5 and 6, the forced draft ingress blower 7, the ingress air heating manifold 15 which is formed around the inner halves of the cylinders 14, and the ingress ports 16, Fig. 2, which are disposed in the walls of said cylinders. Simultaneously with the foregoing ingress supply, the exhaust or residue gases are induced under a negative pressure from said cylinders to the atmosphere by means of and via the egress ports 17 which are disposed in the walls of said cylinders on the opposite sides to said ingress ports 16, the egress passages 18, the induced draft egress blower 8, the egress manifold 19, and the egress pipes 20, the path of travel of said air from the atmosphere into said cylinders and the path of travel of the residue gases from said cylinders to the atmosphere being indicated by the arrows K—K in Fig. 1.

With reference to Figs. 1 to 3 inclusive, the aviation engine illustrated in these figures is air cooled and the cylinders 14 of said aviation engine are secured to the combined crank case and engine body portion 2 by being screwed into the latter the proper alinement of the ingress ports 16 and egress ports 17 with their respective adjoining compartments 15 and 18 being obtained by installing the proper thickness of shims 23 beneath the shoulders 24 that will allow the cylinders to be secured tight with the ports 16 alining with compartment 15, and ports 17 alining with compartments 18. The middle portions 25 of the length of the cylinders 14 are a snug fit in the engine body portion 2 so as to prevent leakage between the air heating manifold 15 and the exhaust passages or compartments 18, and the inner portions of said cylinders are equipped with the fins 26 for the purpose of simultaneously heating the ingress air supply in manifold 15 and cooling said cylinders.

In both the aviation engine and general service engine embodiments illustrated the ingress and egress communication with the cylinders 14 and 14a is controlled by the pistons 32 passing intermittently over the ingress and egress ports, said pistons being equipped with suitable deflector flanges 33 for the purpose of guiding the ingress air into the ends of said cylinders, and said ingress and egress ports being preferably made sloping (as illustrated in Figs. 4, 5 and 6) for the purpose of respectively guiding the ingress air into and the exhaust gases from the extreme ends of said cylinders.

With reference to Figs. 1 and 2, the ingress air control means consists of, a butterfly valve disc 34, a lever 35 secured to the stem 36 of said disc, a ratchet 37 for the purpose of locking said disc in various adjustment positions, and a remote control rod 38 for the purpose of adjusting said disc. The butterfly valve disc 34 is for the purpose of controlling the volume of the ingress air being supplied to the engine cylinders by the forced draft ingress blower or supercharger 7. Said valve 34 is adapted to be opened or closed to different degrees by the convenient operation of remote control rod 38. When said valve 34 is completely closed, the intake air or charge in the intake or super-charge manifold 15 or 15a is at the highest, and therefore a greater volume of air or charge will be intaken into each cylinder. When said valve 34 is open air will escape therethrough to the atmosphere from said manifold 15 or 15a and accordingly lesser pressure will exist in said manifold and lesser air will be intaken into each cylinder.

With reference to Figs. 1, 3, 5 and 6, the crank compartments 2a of the engine body portions 2 are ventilated in the following manner: In the aviation engine, Figs. 1 and 3, a pipe 39 is screwed into one of the heads 40 of the casing 2 in such a manner as to form communication between the crank compartment 2a and the suction side of the ingress blower 7, while in the general service engine, Figs. 5 and 6, a hole 41 in one of the heads 40a of the casing 2 forms communication between the crank compartment 2a and the compartment 42, and a pipe 39a screwed in the hub 3a forms communication between the compartment 42 and the suction side of the first stage ingress blower 7a. In both cases a slight vacuum or negative pressure is created in said crank compartments 2a due to the suction taken therefrom by said ingress blowers, and a slight amount of ingress air from the ingress ports 16 and 16a is drawn into said compartments 2a around the periphery of the pistons 32 and by the inner oil seal rings of said pistons.

Heretofore the engine has been described as adapted for aviation purposes and specifically describing the two-cycle motor, but the same is adapted also to the four-cycle engine.

Figs. 4, 5 and 6 illustrate my invention as applied to a water-cooled engine which may be used for other than aircraft purposes. The principal differences over the engine previously disclosed is that the cylinders 14a are secured to the engine housing 2 by stud bolts 27, the middle portions 25a and the inner portion 28 of the length of each of said cylinders 14a being a snug fit in their respective separated bores in the annular housing 2, each of said snug fits being packed against leakage by packing rings 29 and 30, respectively. The portions of each of the cylinders 14a exposed within the intake air space 15a are provided with heat exchanger fins 26a for increasing the heat exchange of said cylinders with the intake air in said intake space 15a. The blower in Fig. 6 is attached to hub 3a removably secured to an end of the crank shaft 1 from which extends a plurality of spokes 13 to the outer ends of which is secured an L-shaped annular disk having a substantially Z-shaped annular sheet metal disk secured to its inner side with the outer edges of said disks substantially parallel. To the inner surfaces of the outer edges of each of said disks are secured parallel spaced apart rows of fan blades 8a and 8b. To the inner edge of a projection of hub 3a are secured the inner edges of two metal annular disks which are spaced apart at their peripheries, and to which and said L-shaped disk are secured separated rows of fan blades 7a and 7b.

Intake air enters the blower past the spokes 13 to the inner intake edges of the row of blades 7a whose rotation forces the air upwardly against the Z-shaped disk 11 and thence to the right in Fig. 6 to the inner intake side of the row of blades 7b, which progressively increase the velocity of the intaken air to the intake manifold space 15a, thence through the intake air ports 16 to the cylinder. After the resulting explosion the combustion products are exhausted through exhaust ports 17a into exhaust space 18a, thence to the inner intake edges of the row of fan blades 8a which discharge the exhaust products into the annular space 21a, thence to the left and downwardly between the inner intake edges of the row of fan blades 8b and the outer surface of the web of the Z-shaped annular ring 11. The discharge of the exhausted combustion products through the fan blades 8b further accelerates the velocity of said products imparted thereto by the fan blades 8a and discharge the same into the annular exhaust manifold 19a from which the same escape to the air through a plurality of openings 22.

It will be understood that in each of the disclosures the heat of the exhausted combustion products passing through exhaust space 18 in Fig. 1 will impart a substantial amount of its heat to the intake air blowing through the annular intake space 15 by conduction through the wall intermediate said spaces as well as through the tapering peripherical wall of the W-shaped disk 6; and that in the structure disclosed in Fig. 6 said heat exchange will be effected by heat conduction through the wall between the spaces 15a and 21a, and through the web wall of the Z-shaped ring 11.

The ingress and egress blowers illustrated in Figs. 5 and 6 are pressure compounded by and through constructing the first stage ingress blower 7a of a larger capacity than the second stage ingress blower 7b and separating said first and second stage ingress blowers by an ingress receiver chamber 21, and by constructing the first stage egress blower 8a of a larger capacity than the second stage egress blower 8b and separating said first and second stage egress blowers by an egress receiver chamber 21a.

Ordinarily the ingress and egress blowers should be designed so as to be of a greater capacity than necessary to fill the cylinders with a fresh ingress charge and remove the exhaust or residue gases from said cylinders, this excess capacity being for the purpose of thoroughly scavenging said cylinders of residue gases by allowing a small amount of excess ingress air to pass on into the exhaust.

When practicable the cylinders of the engine should lay horizontal and the ingress and egress blowers should be located above the engine as illustrated in Fig. 6 so that the comparatively cool ingress air will enter said cylinders on the lower sides and the hot egress gases will leave said cylinders on the upper sides thereof, and so the egress gases leaving the engine will heat up the ingress gases entering said engine, also so that the greater efficiency of the blowers will be upward due to the fans supplementing the thermal upward flow of the air set in motion by the heat of the cylinders.

The power required to operate the ingress and egress blowers is by no means uselessly expended inasmuch as by the blowers the pistons are relieved of all ingress and egress work of intake and exhaust, since the blower drives in the intake fluid and drives out the exhaust gases.

The invention herein described may be manufactured and used by or for the Government of the United States of America for governmental purposes without the payment to me of any royalty thereon or therefor.

Having fully described my invention, what I claim as new and desire to secure by Letters Patent is:—

1. In a combustion engine the combination of the cylinders thereof, a rotary blower comprising a circular frame open near its center for the reception of intake air and provided with annular rows of impeller and expeller vanes in different planes, inlet and exhaust means for the cylinders, an annular projection extending laterally from a casting bearing the walls of the cylinders with portions of said projection extending juxtaposed with clearance spaces between the same and the peripheries of the blower frame and said impeller and expeller rows, there being separated inlet and exhaust openings extending through the annular projection respectively from said inlet and exhaust means to the outlet and inlet faces respectively of said impeller and expeller vanes, said impeller and expeller vanes respectively charging and exhausting the cylinders, said blower being within said recess and the walls of said casting within said projection further serving with said projection as the casing of the blower.

2. The combustion engine combination of claim 1, characterized by a plurality of annular rows of each such vanes successively in the path of and progressively accelerating the velocities respectively of the intake and exhaust, with the inlet and exhaust openings communicating with the ultimate outlet and the primary inlet faces respectively of the impeller and expeller vanes to the peripheries of which portions of said annular projection are juxtaposed with intermediate clearance space.

3. In a combustion engine the combination with the crank shaft and crank case thereof, of cylinders arranged radially from and about said shaft and case, a rotary blower fixed to said shaft and having an annular row of impeller vanes, means surrounding said fan and having an inlet opening leading from each cylinder to adjacent an edge of said impeller vanes, and an open mouthed pipe extending from the wall of the crank case and having an unobstructed bore into said crank case and which mouth is adjacent the intake side of said vanes and which vanes pass over the mouth of and draw air from the pipe for ventilating and causing a slight vacuum in said crank case.

4. In a combustion engine the combination of a crank shaft, a plurality of radial cylinders about said shaft and having pistons, connecting rods connecting the pistons to the crank shaft, a blower frame having a central hub drivingly mounted on said shaft, an annular ring about said hub, radial fan blades rigidly connecting said ring to said hub, a row of fan vanes secured to one side of said ring, and means forming a part of the engine and having annular portions extending about and juxtaposed to a periphery of said ring and said row, there being intermediate said portions an opening in said means extending from each cylinder to adjacent an edge of said vanes, said blower being within said annular portions, and the annular and a side portion of said means forming corresponding portions of the casing of the blower.

5. In a combustion engine, the combination of cylinders having pistons, an annular projection open at its outer end, and exhaust means extending from said cylinders and opening into the recess formed by said projection, a blower of a diameter insertable through the open end of said projection, said blower being substantially within said recess and occupying said open outer end and having an annular row of fan blades whose inlet edges are adjacent the opening of the exhaust means, and power transmitting means operatively connecting said pistons and blower.

6. In a combustion engine the combination of a cylinder and crank shaft assembly, intake and exhaust means for the cylinder, a forced draft blower mounted to be rotated by the engine and said crank shaft and having annular rows of impeller and expeller vanes in different planes, an annular rim revoluble with said blower and having a portion extending laterally to the impeller vanes and separating said expeller vanes from the interior portion of the blower and forming an annular space juxtaposed to the intake edges of said expeller vanes, and means forming a stationary part of the engine and extending about said blower and having an opening extending from said exhaust means to said space and a different opening extending from the discharging edge of said impeller vanes to said intake means, the interior portion of said blower being open to the atmosphere and the intaking edge of said impeller vanes being in communication with the interior portion of said blower, said blower being within said annular portions, and said annular and a side portion of said engine-part-means forming corresponding portions of the casing of the blower.

7. The combustion engine combination of claim 6 characterized by said portion of the rim being conical with its edge of largest diameter facing toward the atmosphere, and its edge of smaller diameter adjacent the impeller vanes.

8. The combustion engine combination of claim 4 characterized by an aircraft propeller drivingly positioned on the crank shaft in advance of the blower, whereby the portions of the propeller adjacent the blower drive air into the fan blades by the rotation of said propeller as well as by the travel of the engine through the air.

9. The combustion engine combination of claim 6 characterized by said rim having a conical portion with its edge of largest diameter facing toward the atmosphere and its edge of smaller diameter adjacent the impeller vanes, and further characterized by radial fan blades extending across the diameter of said rim; and said vanes, blades, rim and portion being secured together.

10. The combustion engine combination of claim 6 characterized by a plurality of annular rows of each of said vanes successively in the path of and progressively accelerating the velocities respectively of the intake and exhaust, and further characterized by portions of the blower and said engine-part-means comprising walls confining the paths of communication between the vanes in each row.

11. The combustion engine combination of claim 1 characterized by a substantially conical shaped member extending within said vanes and facing toward and leading the atmosphere to the impeller vanes and thence to the inlet openings into the inlet means of the cylinders.

12. The combustion engine combination of claim 6 characterized by a conical shaped member extending substantially centrally within said rows of vanes with its larger diameter adjacent the intake edges of said row of impeller vanes.

13. In a combustion engine, the combination of a plurality of radially disposed cylinders and the crank shaft assembly thereof, the engine having a housing provided with a circular recess in a side thereof surrounding the crank shaft, a rotatable blower frame in and closing said recess with the periphery of said frame juxtaposed to and conforming to the mouth of said recess, said frame being mounted upon and driven by said shaft and having annular rows of impeller and expeller vanes mounted on said frame and occupying said recess, intake and exhaust means for each cylinder, said housing having an opening leading from the exhaust means of each cylinder to the input face of the expeller vanes, said frame of said blower being open to the atmosphere at its central portion, the input face of the impeller vanes being in communication with said central portion, and said recess having exhaust manifold openings extending through said housing and having their outlets juxtaposed to and communicating with the output face of the expeller vanes.

14. In a combustion engine the combination of a radial engine cylinders and crank shaft assembly, a pressure compounded rotary forced draft blower having a plurality of annular separated rows of impeller vanes the initial row of which vanes being open to the atmosphere on its input face, means mounted with the cylinders of said assembly and forming part of and having a circular recess in a side of the engine, the inner wall of said recess being adjacent a plane coincident with the longitudinal axis of the bore of cylinders of the engine, said blower occupying said recess whose annular and inner walls form the casing of said blower, said last stated means and said blower having surfaces which lead intake air from the outer face of said initial row in a course between said rows to the input face of the other of said rows, intake means for the cylinders, and said last stated means having an opening leading from the output face of said other row of vanes to said intake means.

15. In a combustion engine, the combination of a cylinder and crank shaft assembly, a rotary blower driven by the engine and having a plurality of annular separated rows of expeller vanes, means forming a part of and having a circular recess in a side of the engine, the inner wall of said recess being adjacent the plane of the longitudinal axis of the bore of a cylinder of the engine, said blower occupyng substantially the whole depth of said recess whose annular and inner walls form the casing of said blower, an element of the blower also functioning as the outer wall of the casing of the blower, said last stated means and said blower having elements for leading exhaust products of the cylinder from the output face of the initial one of said rows in a course between said rows to the input face of the adjacent row of said vanes, exhaust means for said cylinder including an element of the first stated means and having a relatively short opening leading from said exhaust means to the input face of said initial row of vanes.

16. The combustion engine combination of claim 15 characterized by the first stated means surrounding the output face of the last row of said vanes, functioning as an exhaust manifold having at least one outlet therefrom leading to the atmosphere.

17. In a combustion engine, the combination of a radial cylinder and crank shaft assembly, a rotary blower mounted on and driven by said shaft and having a plurality of spaced apart annular rows of impeller and expeller vanes, the input face of the initial one of the rows of impeller vanes being open to the atmosphere, intake and exhaust means for each cylinder, means fixed with and extending from one side of the engine and having a circular recess concentric with said shaft, said recess having two separated sets of openings therein, one set of said openings leading from the exhaust means of each cylinder to the intake face of the initial row of expeller vanes and the other set of said openings leading from the output face of the final row of impeller vanes to the intake means of each cylinder; said fixed means having sets of annular separated spaces whose marginal walls register with and are juxtaposed to the lateral marginal walls of their respective rows of vanes of the blower, one set of said spaces leading from the output face to the input face of adjacent rows of expeller vanes by way of the space between said rows of expeller vanes and the other of said spaces leading from the output face to the input face of adjacent impeller vanes by way of the space between said rows of impeller vanes, said last stated means having a recess concentric with the shaft and occupied by the blower; the blower having an element closing the mouth of said recess and an opening therethrough for leading intake air to the input face of the initial row of impeller vanes, said element and the annular and the side walls of said recess forming the casing of the blower.

18. The combustion engine combination of claim 17 characterized by said rows of impeller vanes being within and spaced apart from said rows of expeller vanes, and said rows being mounted upon a common frame.

19. The combustion engine combination of claim 17 characterized by said fixed means having an outer element surrounding the output face of the ultimate row of expeller vanes and comprising an exhaust manifold open to the atmosphere.

20. The combustion engine combination of claim 17 characterized by a plurality of circular plates secured near their peripheries to the sides of the rows of vanes, and said plates being rotatable by said shaft.

21. In a combustion motor the combination of a frame, a crank shaft mounted therein, a plurality of cylinders mounted therein at an angle to each other and extending toward said shaft, pistons in said cylinders with means for connecting said pistons to said shaft, intake and exhaust means for each of said cylinders, a recess in one side of said frame concentric with said shaft and open at its outer end, a blower element on said shaft and occupying the open outer end of said recess, a plurality of rows of fan vanes mounted on said element and within said recess, there being a row of said vanes for intake and a row of said vanes for exhaust, said recess having separate openings leading to the intake and exhaust means respectively from adjacent the output face of the intake row of vanes and from the intake face of the exhaust row of vanes, said blower element having a lateral opening communicating with the atmosphere and with the intake face of the intake row of vanes, and said blower within said recess being of a diameter substantially that of the open outer end of said recess.

FRANK DAVID BUTLER.